United States Patent [19]
Nanbu

[11] Patent Number: 5,477,236
[45] Date of Patent: Dec. 19, 1995

[54] METHOD AND APPARATUS FOR CONTROLLING MOVEMENT OF CURSOR

[75] Inventor: Shunji Nanbu, Narashino, Japan

[73] Assignee: Hitachi, Ltd., Tokyo, Japan

[21] Appl. No.: 708,814

[22] Filed: May 31, 1991

Related U.S. Application Data

[63] Continuation of Ser. No. 156,969, Feb. 18, 1988, abandoned.

[30] Foreign Application Priority Data

Mar. 20, 1987 [JP] Japan .................................. 62-63915

[51] Int. Cl.⁶ .................................................. G09G 5/00
[52] U.S. Cl. ............................................ 345/145; 345/157
[58] Field of Search ...................................... 340/706, 707, 340/708, 709, 710, 711, 712, 723, 724; 345/145, 157

[56] References Cited

U.S. PATENT DOCUMENTS

| | | | |
|---|---|---|---|
| 4,555,699 | 11/1985 | Citron et al. | 340/709 |
| 4,587,520 | 5/1986 | Astle | 340/709 |
| 4,622,641 | 11/1986 | Stephens | 340/709 |
| 4,646,073 | 2/1987 | Fukunaga et al. | 340/709 |
| 4,668,947 | 5/1987 | Clarke, Jr. et al. | 340/709 |
| 4,686,522 | 8/1987 | Hernandez et al. | 340/709 |
| 4,698,625 | 10/1987 | McCaskill et al. | 340/709 |

FOREIGN PATENT DOCUMENTS

| | | |
|---|---|---|
| 57-29941 | 7/1980 | Japan . |
| 58-90433 | 6/1983 | Japan . |
| 58-129643 | 8/1983 | Japan . |
| 59-6240 | 1/1984 | Japan . |
| 59-22126 | 2/1984 | Japan . |
| 59-111524 | 6/1984 | Japan . |

OTHER PUBLICATIONS

Bier et al., "Snap–Dragging", Aug. 1986, pp. 233–240.

*Primary Examiner*—Richard Hjerpe
*Attorney, Agent, or Firm*—Antonelli, Terry, Stout & Kraus

[57] ABSTRACT

Movement of a cursor on a display screen is controlled in accordance with movement command information from manually operated cursor movement actuation means such as mouse or cursor movement control key. The cursor is moved along a curved line drawn on the display screen, in accordance with the movement command information.

35 Claims, 9 Drawing Sheets

METHOD AND APPARATUS FOR CONTROLLING MOVEMENT OF CURSOR

This application is a Continuation of application Ser. No. 07/156,969, filed Feb. 18, 1988, now abandoned.

BACKGROUND OF THE INVENTION

1. Field of the Invention

The present invention relates to method and apparatus for controlling movement of a cursor on a screen of a display device of a computer system.

2. Description of the Related Art

A computer system is equipped with a display device for inputting and outputting data. A cursor or a mark called icon (hereinafter they are collectively called cursors) is used to indicate a position on the screen of the display device to be processed. In order to move the cursor to a desired coordinate position on the screen, various coordinate pointing devices may be used. A most common one is a cursor control key arranged on a keyboard. A mouse, a joy stick and a track ball can move the cursor in any desired direction on the screen by manipulating an actuator, and the operation thereof is easy and effective.

A mouse usually has a ball bearing on the bottom thereof, and it is rolled on a desk so that coordinates are generated by rotation angles of the ball bearing. A joy stick usually has an actuation rod which is gripped by an operator and inclined in any direction so that coordinates are generated. A track ball has a ball which is rotatable in any direction. The ball is rotated by a palm or finger of an operator so that coordinates are generated by rotation angles of the ball. These devices parallelly produce X-axis movement signals and Y-axis movement signals which determine the direction and distance of movement of the cursor. The computer unit receives the X-axis and Y-axis movement signals and controls the movement of the cursor on the screen in accordance with those signals. The ratio of the movement of the actuator to the movement of the cursor has been predetermined, and the movement of the cursor is controlled in proportion to the movement of the actuator based on the predetermined ratio.

Those technologies are disclosed in JP-A-58-149535, JP-A-58-129643, JP-A-59-111524, JP-A-59-22126, JP-A-57-29941(U), JP-A-59-6240(U) and JP-A-58-90433(U).

The display device has a cursor coordinate memory for storing coordinates of a cursor on a display screen. The cursor is displayed at the stored coordinate position on the display screen. Accordingly, the cursor display position is altered by altering the content of the cursor coordinate memory. The computer unit has a coordinate pointing device, that is, cursor movement actuation means for producing movement command information for the cursor on the display screen, and coordinate update means for sequentially updating the content of the cursor coordinate memory in accordance with the movement command information. Thus, the computer unit sequentially moves the cursor to desired positions on the display screen in accordance with the coordinate information in the cursor coordinate memory.

SUMMARY OF THE INVENTION

The coordinate pointing devices described above are frequently used when a graphic pattern is to be drawn on the screen of the display device. Start points and end points of straight lines and curved lines (hereinafter collectively called curved lines) which form the graphic pattern are usually designated by the coordinate pointing device. For example, when a curved line of a graphic pattern is to be drawn starting from one point on a curved line of another graphic pattern, that point is designated as a start point or end point, particularly when a complex graphic pattern is to be drawn. However, when the cursor is moved to designate the point on the curved line, there may occur an error and it is frequently difficult to exactly point to the designated point. The higher the resolution of the display screen is, the greater is the difficulty. There are many cases where the cursor is off the curved line, even if the cursor visually appears on the curved line on the display screen.

A start point or an end point on a curved line is frequently determined by considering a balance with the graphic pattern already drawn on the display screen, and it is frequently required to slightly change the designated position.

Accordingly, it is a very difficult task to designate a point on a particular portion of a curved line and to determine that point by finely changing the cursor position.

It is an object of the present invention to provide a method and an apparatus for controlling the movement of a cursor which improve operability in moving the cursor.

It is an another object of the present invention to provide a method and an apparatus for controlling the movement of a cursor which facilitate movement of the cursor along a curved line drawn on a display screen and improve operability of the movement of the cursor.

It is another object of the present invention to provide a method and an apparatus for controlling the movement of a cursor which facilitate switching between normal operation of the cursor and movement of the cursor along a curved line drawn on a display screen.

It is another object of the present invention to provide a method and an apparatus for controlling the movement of a cursor which can be used when a graphic pattern is to be drawn on a display screen of a graphic display device.

The above objects are achieved in a system which controls movement of a cursor on a display screen in accordance with movement command information from manually operated cursor movement actuation means by sequentially receiving the movement command information from the cursor movement actuation means and sequentially moving the cursor along a curved line drawn on the display screen in accordance with the received information.

In this manner, the cursor can be readily moved on the curved line drawn on the display-screen in response to the actuation of the cursor movement actuation means by an operator so that the operability of the cursor movement is improved.

In accordance with one preferred embodiment of the present invention, the actuation by the operator to move the cursor is detected. Based on the detection, the cursor is sequentially moved along the curved line on which the cursor is positioned, in accordance with movement command information from the cursor movement actuation means.

In accordance with another preferred embodiment of the present invention, the actuation by the operator to move the cursor is examined. If it is a specified actuation, the cursor is sequentially moved along the curved line on which the cursor is positioned, in accordance with the movement command information from the cursor movement actuation means. If it is not the specified actuation, the cursor is moved in accordance with the movement command information from the cursor movement actuation means.

In accordance with another preferred embodiment of the present invention, the apparatus comprises a cursor coordinate memory for storing coordinate information of a cursor on a display screen, display means for displaying the cursor at a predetermined position on the display screen in accordance with the coordinate information stored in the cursor coordinate memory, cursor movement actuation means for producing command information relating to the movement of the cursor on the display screen, and cursor position updating means for sequentially updating the content of the cursor coordinate memory to move the cursor along a line drawn on the display screen in accordance with the command information.

In accordance with another preferred embodiment of the present invention, the apparatus has specific actuation detection means for detecting a specific actuation by an operator to move the cursor and for producing detection information. The cursor position updating means responds to the detection information to sequentially update the content of the cursor coordinate memory in order to move the cursor along the curved line drawn on the display screen.

In accordance with a further preferred embodiment of the present invention, the apparatus has discrimination means for determining the presence or absence of the specific actuation by the operator to move the cursor and for producing presence information or absence information, cursor movement updating means responsive to the presence information from the discrimination means for updating the content of the cursor coordinate memory to sequentially move the cursor along the curved line drawn on the display screen on which curved line the cursor is positioned, in accordance with the movement command information from the cursor movement actuation means, and cursor movement control means responsive to the absence information from the discrimination means for sequentially updating the content of the cursor coordinate memory to move the cursor in accordance with the movement command information from the cursor movement actuation means.

DESCRIPTION OF THE PREFERRED EMBODIMENTS

One embodiment of the present invention is now explained with reference to the accompanying drawings. In the present embodiment, a mouse is used as the coordinate pointing means, that is, as the cursor movement actuation means for producing movement command information of a cursor on a display screen.

Figure 2:
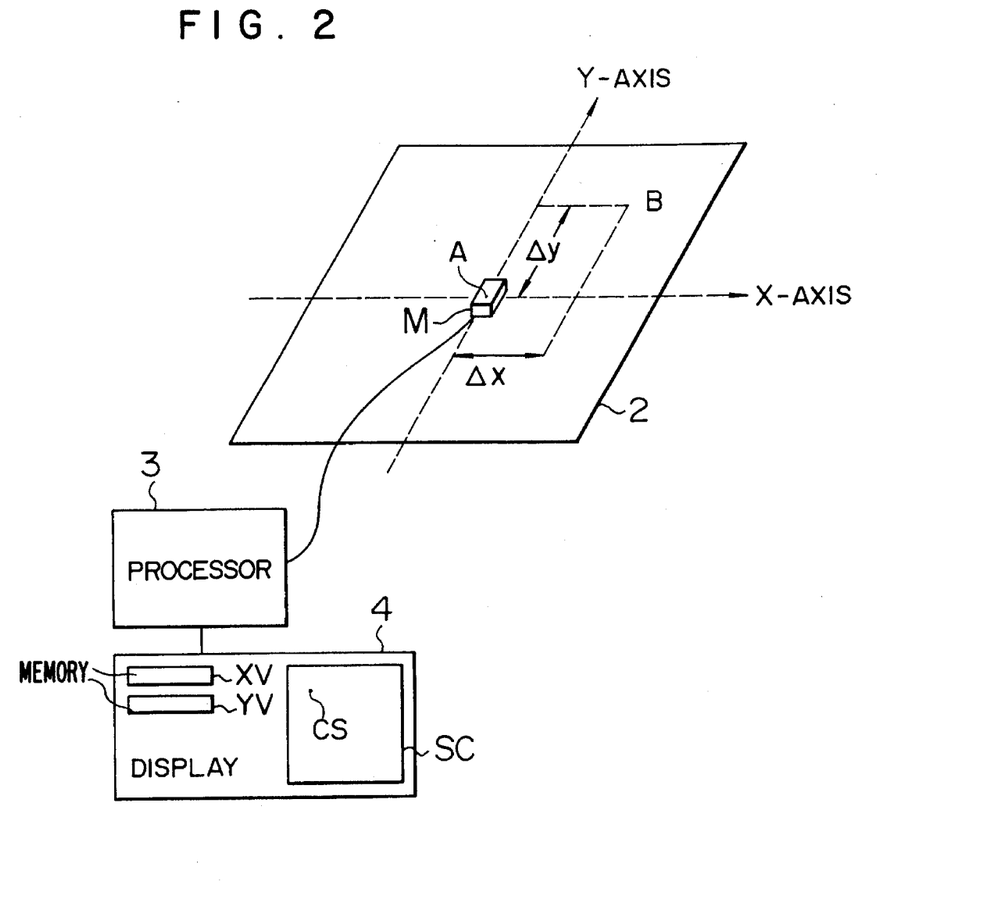
FIG. 2 shows an external view of an overall cursor movement control unit which uses a mouse, in accordance with one embodiment of the present invention.
Figure 3:
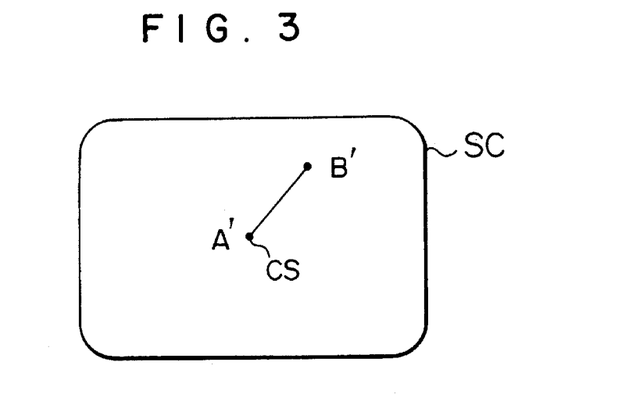
FIG. 3 shows a display screen for illustrating movement of a cursor by moving the mouse.

FIGS. 2 and 3 explain an outline of the mouse. M denotes a mouse, numeral 2 denotes a plate such as a mat or desk, numeral 3 denotes a processor such as a personal computer and numeral 4 denotes a display device. The mouse M is moved on the mat 2 to determine coordinates of a cursor CS on a display screen SC of the display device 4. In FIG. 3, it is assumed that the cursor CS is at a point A' on the screen SC of the display device and the mouse M is at a corresponding point A. When the mouse M is linearly moved to a point B on the mat 2, the mouse M detects an X-axis displacement $\Delta X$ and a Y-axis displacement $\Delta Y$ and sends that information to the processor 3. The processor 3 calculates coordinates of the cursor based on that information and stores the result in an X-axis coordinate memory XV and a Y-axis coordinate memory YV of the display device 4. The display device 4 moves the cursor CS to a point B' on the screen SC based on the contents of the memories XV and YV.

Figure 4:
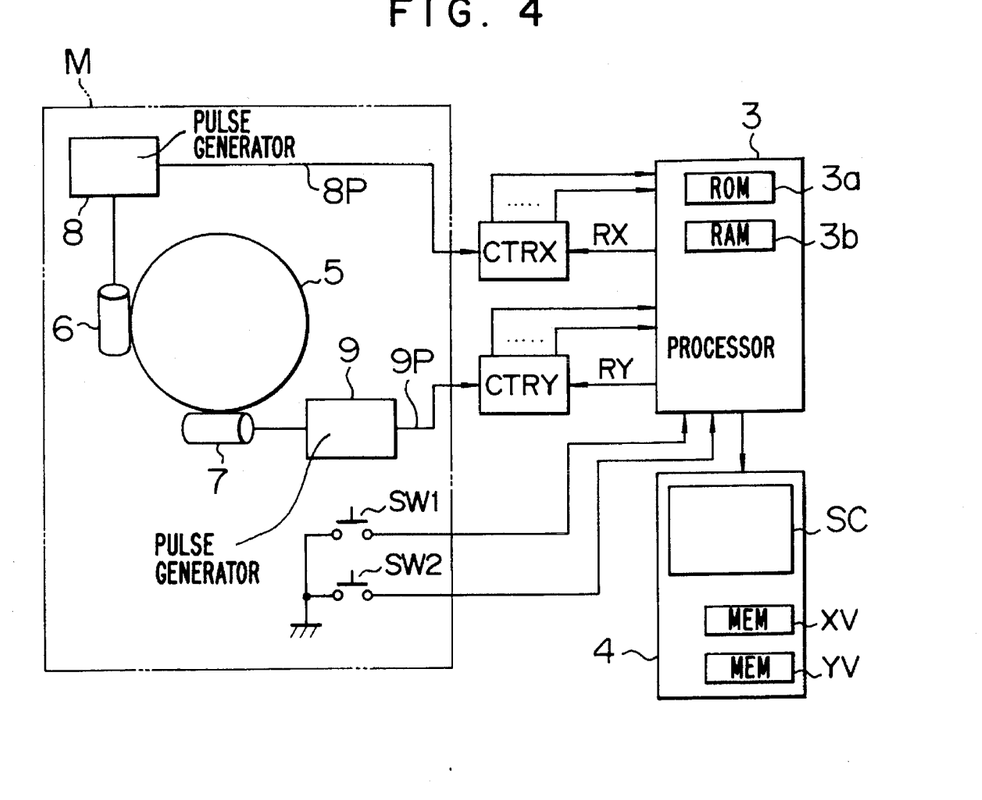
FIG. 4 shows a block diagram of an overall configuration of the cursor movement control unit which uses the mouse, in accordance with one embodiment of the present invention.
Figure 5:
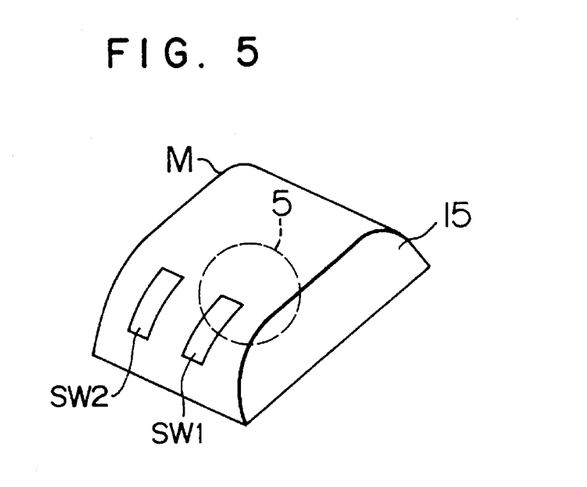
FIG. 5 shows a perspective view of the mouse.

Reference is made to FIG. 4. M denotes a mouse whose external view is shown in FIG. 5. It has a case 15 and a ball 5 rotatably held by the case 15. The case 15 contains an X-axis detection roller 6 which contacts the ball 5 and is rotated by the rotation of the ball 5, and a Y-axis detection roller 7 of a similar structure arranged orthogonally to the X-axis detection roller 6. Numeral 8 denotes a pulse generator coupled to the roller 6, which generates a pulse signal 8P as the roller 6 is rotated. Numeral 9 denotes a pulse generator coupled to the roller 7, which generates a pulse signal 9P as the roller 7 is rotated. CTRX denotes an X-axis counter for measuring an X-axis displacement, and CTRY denotes a Y-axis counter for measuring a Y-axis displacement. The counts of the counters CTRX and CTRY are supplied in the form of 10-bit binary data to the processor 3. The counts of the counters CTRX and CTRY may be individually reset or cleared to zero by reset command signals RX and RY from the processor 3.

As the mouse is moved, the ball 5 is rotated and the X-axis roller 6 and the Y-axis roller 7 which contact the ball 5, are rotated. The rotations thereof are transmitted to the pulse generators 8 and 9 which generate the pulses 8P and 9P representing the rotations or displacements. The pulses 8P and 9P are supplied to the pulse counters CTRX and CTRY, respectively, and are counted thereby. Accordingly, the displacements of the mouse M are detected by referencing the counters CTRX and CTRY.

The counters CTRX and CTRY are connected to the processor 3 which may be a microcomputer so that the counts of the counters CTRX and CTRY can be referenced and controlled by the processor 3. The mouse M usually has a plurality of key switches SW1 and SW2 to issue various commands to the current position of the cursor CS. In the present embodiment, the mouse has two key switches. The switches SW1 and SW2 are also connected to the processor 3 so that the processor 3 can detect the ON/OFF status of the switches. The processor 3 has a read-only memory (ROM) 3a and a random access memory (RAM) 3b. Those memories 3a and 3b store predetermined programs and data, and the processor 3 conducts the predetermined processing by executing those programs. The display device 4 has the display screen SC, the X-axis coordinate memory XV and the Y-axis coordinate memory YV. In the present embodiment, the display device 4 is of dot matrix display type. For example, the display screen SC has 640-dot length and 400-dot height. The display device has a pixel memory having the same number of bits as the number of dots of the display screen SC. To draw a curved line on the display screen, the dots corresponding to the curved line are turned on or caused to emit light on the display screen SC. This is attained by rendering the corresponding bits of the pixel memory to "1". In the apparatus having a graphic pattern drawing function, a start point and an end point of the curved line are designated by the coordinate pointing device and the curved line is drawn so that the bits between those points are rendered "1". As a result, the corresponding dots on the display screen SC emit light so that the desired curved line is displayed on the display screen SC.

Figure 6:
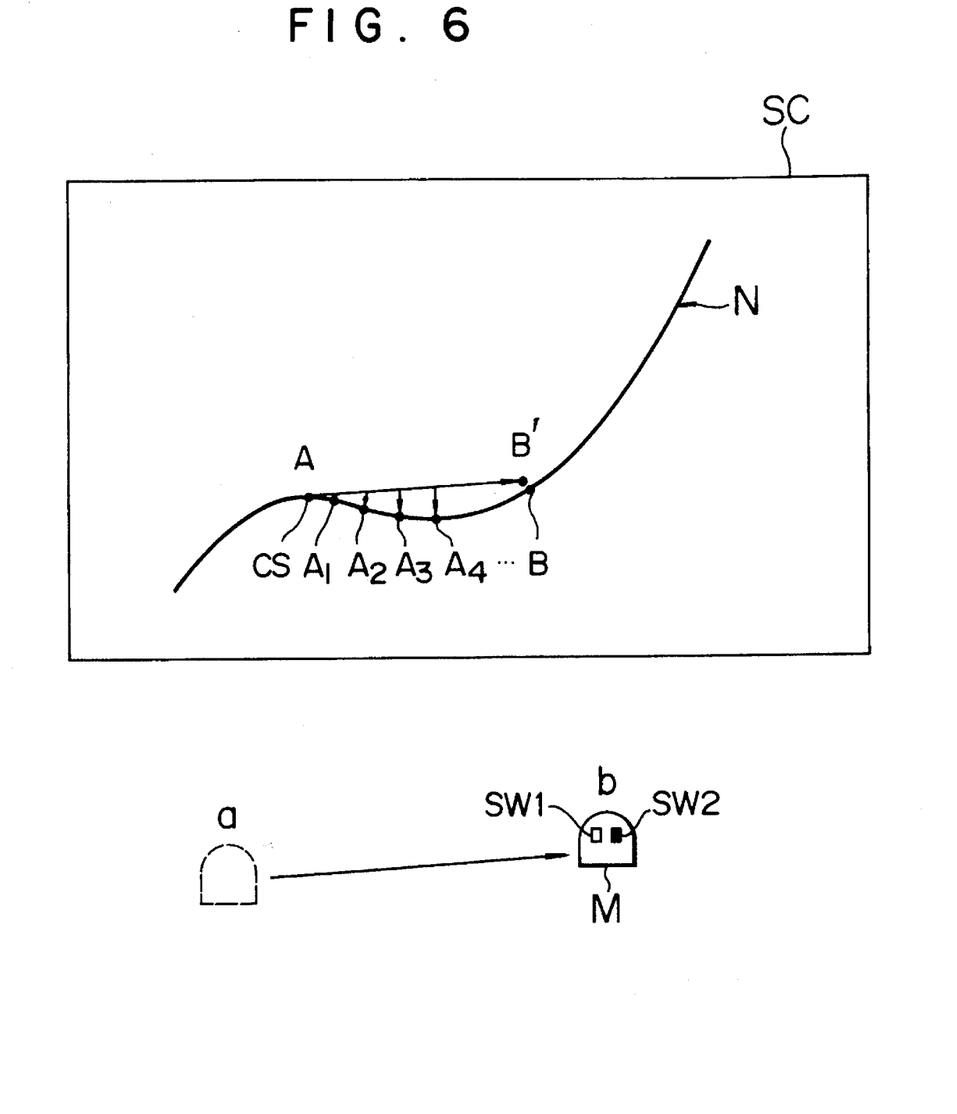
FIG. 6 illustrates control of movement of the cursor in the embodiment of FIGS. 2–5.

FIG. 6 illustrates operation of the cursor in the present embodiment. It is assumed that a curved line N has been drawn on the display screen SC and the cursor CS is at a point A on the curved line N. The mouse M at the bottom of FIG. 6 is now moved. It is assumed that the cursor CS is to be moved from the current point A on the curved line N to a point B on the curved line N. The mouse M is moved from a point a to a point b so that the cursor CS is moved from the point A to the point B on the display screen. In many cases, however, the cursor CS is not moved to the exact point B but moved to a point B'. In the present embodiment, in response to a specific actuation, the position of the cursor CS is changed to a position on the curved line N at a predetermined time interval so that the cursor CS is moved from the point A to the point B along the curved line N to follow points $A_1$, $A_2$, $A_3$, $A_4$, ... by moving the mouse from the point a to the point b.

Figure 7:
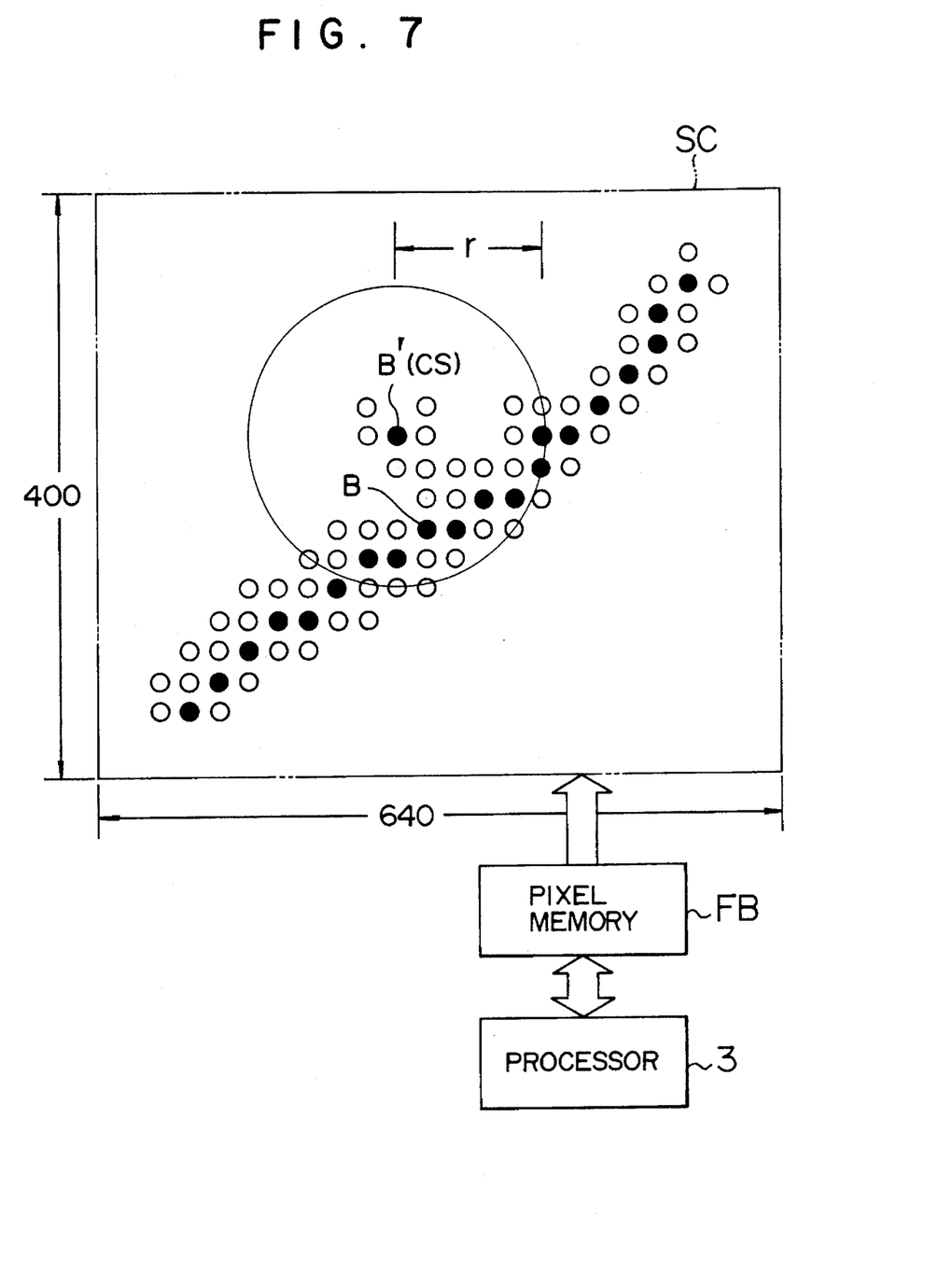
FIG. 7 illustrates a principle of alteration of cursor coodinates in the same embodiment.

FIG. 7 illustrates a principle of alteration of the cursor position in the present embodiment. It is an enlarged view of a portion of the curved line N on the display screen SC. A number of circles are dots of the display screen, and black dots represent ON dots. The line of ON dots represents the curved line N on the display screen. In the present embodiment, the display screen SC has 640-dot width and 400-dot height, as described above. FB denotes the pixel memory which has the same number of bits as the number of dots of the display screen SC. The curved line N is drawn on the display screen SC by turning on or rendering to "1" the corresponding bits by the processor 3. The addresses of the bits of the pixel memory FB corresponding to the dots have been previously determined so that the status of each bit can be referenced by the address. In the present embodiment, a circle which is centered at the point B' at which the cursor CS is positioned and which has a radius r which is incremented by one dot unit starting from zero is considered. The dots which exist on the circumference of the circle are extracted and the status of the dots, that is, ON status or OFF status are determined. When the dot is in the ON status, the cursor position is altered to the coordinates of the ON status dot.

Figure 1:
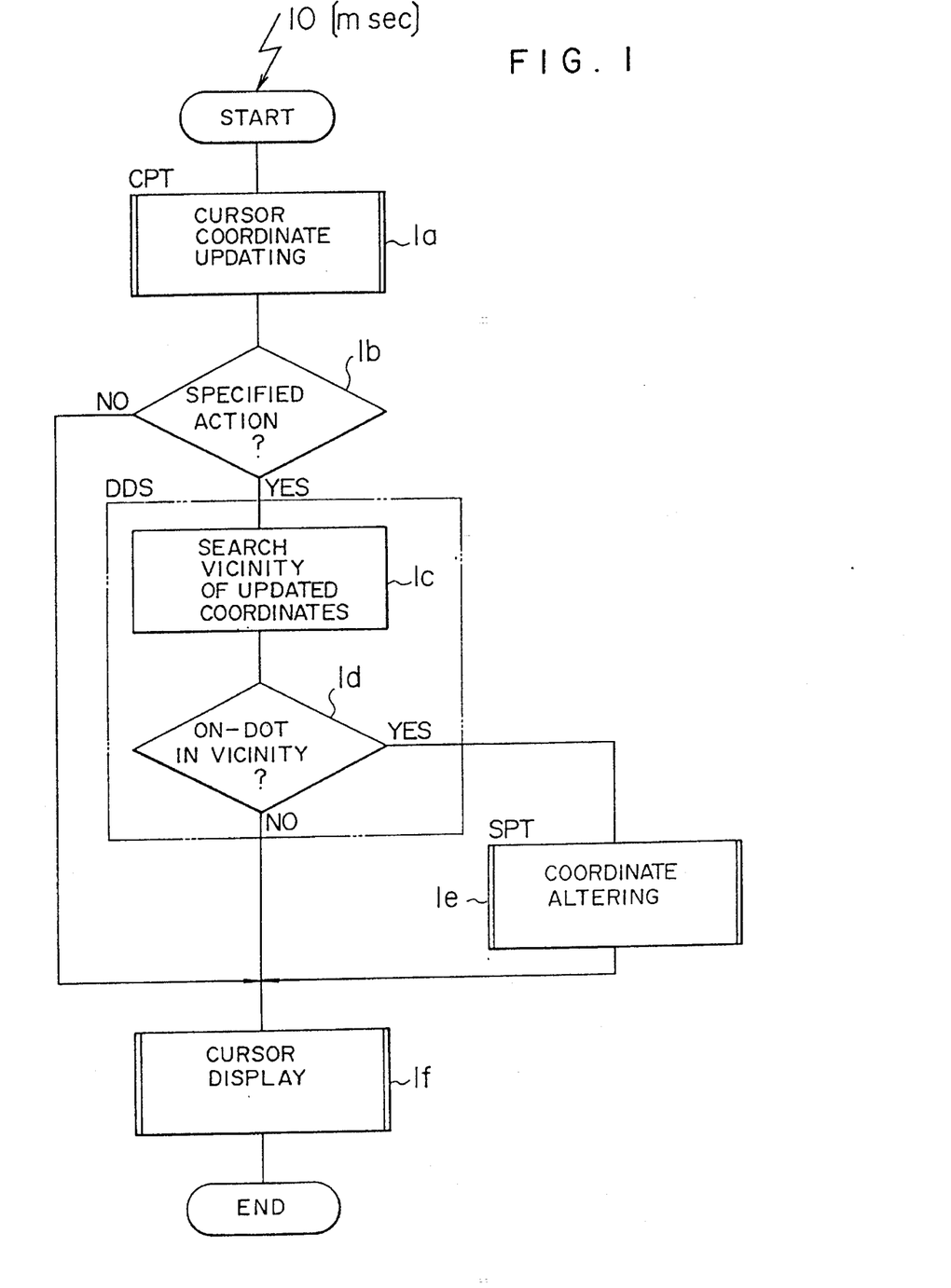
FIG. 1 shows a flow chart of one embodiment of main processing operation which is a principal part of the present invention.

FIGS. 1, 8, 9, 10 and 11 show flow charts of various processing means. FIG. 1 shows a flow chart of main processing means, and FIGS. 8, 9, 10 and 11 show flow charts of various processing means referenced by the main processing means. The procedures of those flow charts are stored, in the form of programs, in the ROM 3a or RAM 3b of the processor 3. Predetermined function means is attained when the processor 3 executes the program.

Figure 12:
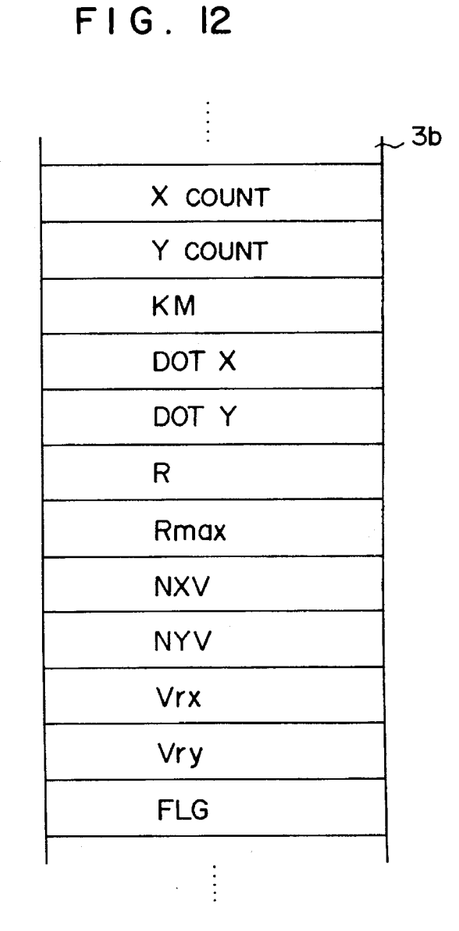
FIG. 12 shows a memory configuration of a buffer memory necessary for the operations of various processing means.

FIG. 12 shows a buffer memory necessary for the execution of those processings. They are set at predetermined addresses in the RAM 3b at the initial points of the programs. In FIG. 12, XCOUNT denotes a memory field to store the count of the X-axis counter CTRX, and YCOUNT denotes a memory field to store the count of the Y-axis counter CTRY. KM denotes a memory field to store a cursor movement ratio Km representing the number of dots for the movement of the cursor CS on the display screen SC. It stores a value predetermined by the apparatus. DOTX and DOTY denote memory fields to store the number of dots of movement on the display screen SC calculated based on the counts stored in the memory fields XCOUNT and YCOUNT and the cursor movement ratio Km. R and $R_{max}$ denote buffer memory fields which are used in determining whether the cursor CS on the display screen SC is in the vicinity of the curved line N drawn on the display screen. The memory unit R stores a radius r of a circle centered at the cursor CS and the memory unit $R_{max}$ stores a predetermined maximum allowable limit of the radius. NXV and NYV denote a next X-axis coordinate memory field and a next Y-axis coordinate memory field which store coordinates on the display screen SC to which the cursor CS is to be moved. Vrx and Vry denote dot a X-axis coordinate memory field and a dot Y-axis coordinate memory field which store coordinates of a dot on the display screen SC. FLG denotes a buffer memory field which temporarily stores the presence or absence of the ON dot in the vicinity of the cursor CS.

The main processing operation shown in FIG. 1 is stored as a series of processings of the computer system by a periodic timer interruption or the like, usually at a period of 10 milliseconds. After the series of processings has been executed, the processing before the interruption is executed. When the processing is started, the coordinate updating means CPT is activated in a step 1a. As will be discussed later, the coordinate updating means CPT updates the coordinates of the cursor CS on the display screen SC in accordance with the movement command information from the mouse M. In the next step 1b, whether the specified actuation has been done or not is determined. Namely, whether a command to alter the coordinates of the cursor CS to a point on the curved line N which is in the vicinity of the coordinates of the cursor CS has been issued or not is determined. In the present embodiment, when the specified actuation is done, the alteration is carried out. Namely, if the specified actuation has been done, discrimination means DDS and the coordinate altering means SPT are activated. If the specified actuation has not been done, the means DDS and SPT are not activated. The specified actuation may be one of various ones so long as whether the means DDS and SPT are to be activated or not can be determined.

In the present embodiment, since the mouse M is used, the depression of the associated switch SW2 is used for the determination. For example, it may be a predetermined key on the keyboard or the switch SW1 of the mouse M. In any case, at the time of execution of the step 1b, if the switch SW2 of the mouse M is not depressed, or not in the ON status, the coordinates of the cursor CS assume the coordinates updated in the step 1a. This is a normal operation and the cursor CS moves in the direction corresponding to the direction of movement of the mouse M to follow the movement of the mouse M. If the switch SW2 of the mouse M is in the depressed position at the time of execution of the step 1b, the process proceeds to the execution by the discrimination means DDS. As will be explained later, the discrimination means DDS examines, in a step 1c, the presence or absence of a point on the curved line N, or an ON dot which forms the curved line N, in a predetermined vicinity from the coordinates of the cursor CS updated in the step 1b. If there is an ON dot in a step 1d, the process proceeds to a step 1e, and if there is no ON dot, the process proceeds to a step 1f. In the step 1e, the coordinate altering means SPT is activated to alter the coordinates of the cursor CS to the coordinates of the ON dot of the curved line N searched in the step 1c. The process then proceeds to a step 1f. In the step 1f, the current cursor CS on the display screen CS is erased, and the cursor CS is displayed at a coordinate position updated in the step 1a or altered in the step 1e.

Thus, by moving the cursor CS to the vicinity of the curved line N drawn on the display screen SC, by manipulating the mouse M and then depressing the switch SW2 of the mouse M, the discrimination means DDS determines that the cursor CS is in the vicinity of the curved line N and the coordinate altering means SPT positions the cursor CS to a point on the curved line N. As described above, this processing is repeatedly executed at a predetermined time interval. Accordingly, when the specified actuation is carried out and the cursor CS is moved by the mouse M, the cursor CS is moved along the curved line N in the commanded direction.

Figure 8:
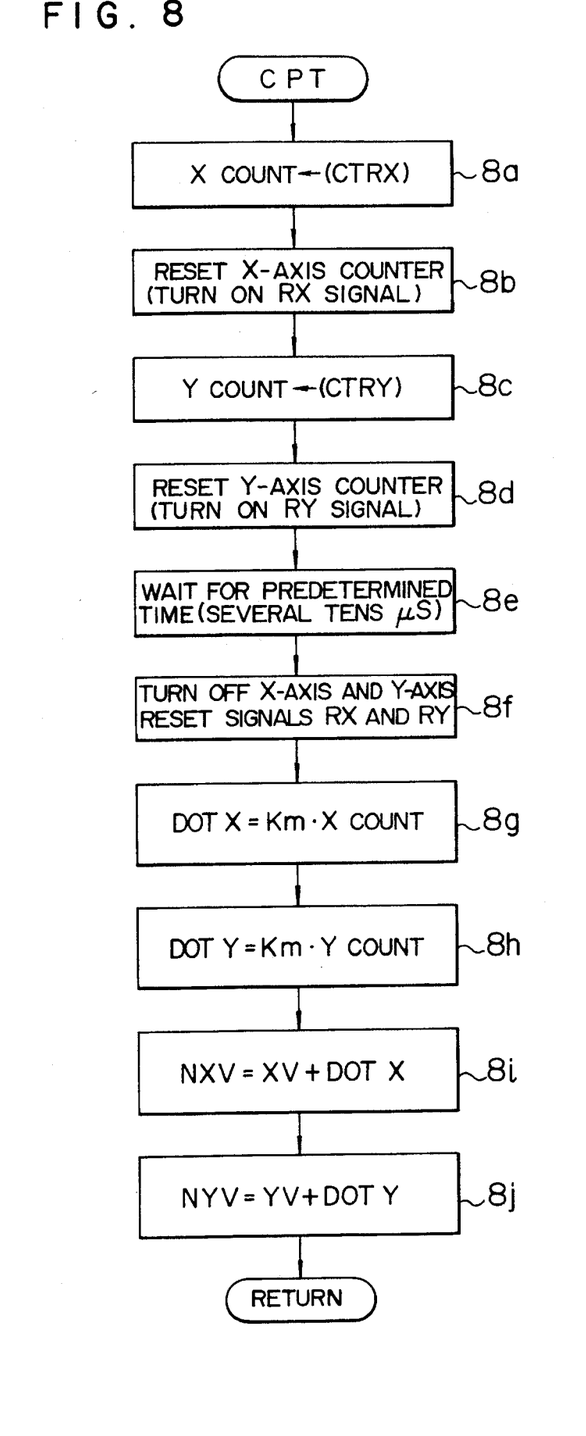
FIG. 8 shows a flow chart of one embodiment of coordinate updating means.

The processing shown in FIG. 1 is now explained in detail. FIG. 8 shows a flow chart of the coordinate updating procedure CPT shown in the step 1a of FIG. 1. When it is started, the means CPT reads in an X-axis displacement of the mouse M, that is, the count of the X-axis counter CTRX in step 8a and stores it in the memory field XCOUNT.

In the next step 8b, it issues a reset command signal RX to reset the content of the X-axis counter CTRX. In step 8c, it reads in the Y-axis displacement of the mouse M, that is, the count of the Y-axis counter CTRY and stores it in the memory field YCOUNT. In the following step 8d, it issues a reset command signal RY to reset the content of the Y-axis counter CTRY. In step 8e, the reset command signals RX and RY are kept on for a predetermined time, for example, several tens of microseconds. In step 8f, the reset command signals RX and RY are terminated. In step 8g, an X-axis dot increment is calculated. In step 8h, a Y axis dot increment is calculated. Namely, the contents of the memory fields XCOUNT and YCOUNT are multiplied by the predetermined cursor movement ratio Km stored in the memory field KM, and the products are stored in the memory fields DOTX and DOTY. In step 8i, an X coordinate on the display screen SC due to the movement of the mouse M is calculated, and in step 8j, a Y coordinate thereof is calculated. Namely, the X-axis and Y-axis coordinate memory fields XV and YV are added to the contents of the memory fields DOTX and DOTY, respectively, and the sums are stored into the next X-axis coordinate memory field NXV and the next Y-axis coordinate memory field NYV, respectively.

Figure 9:
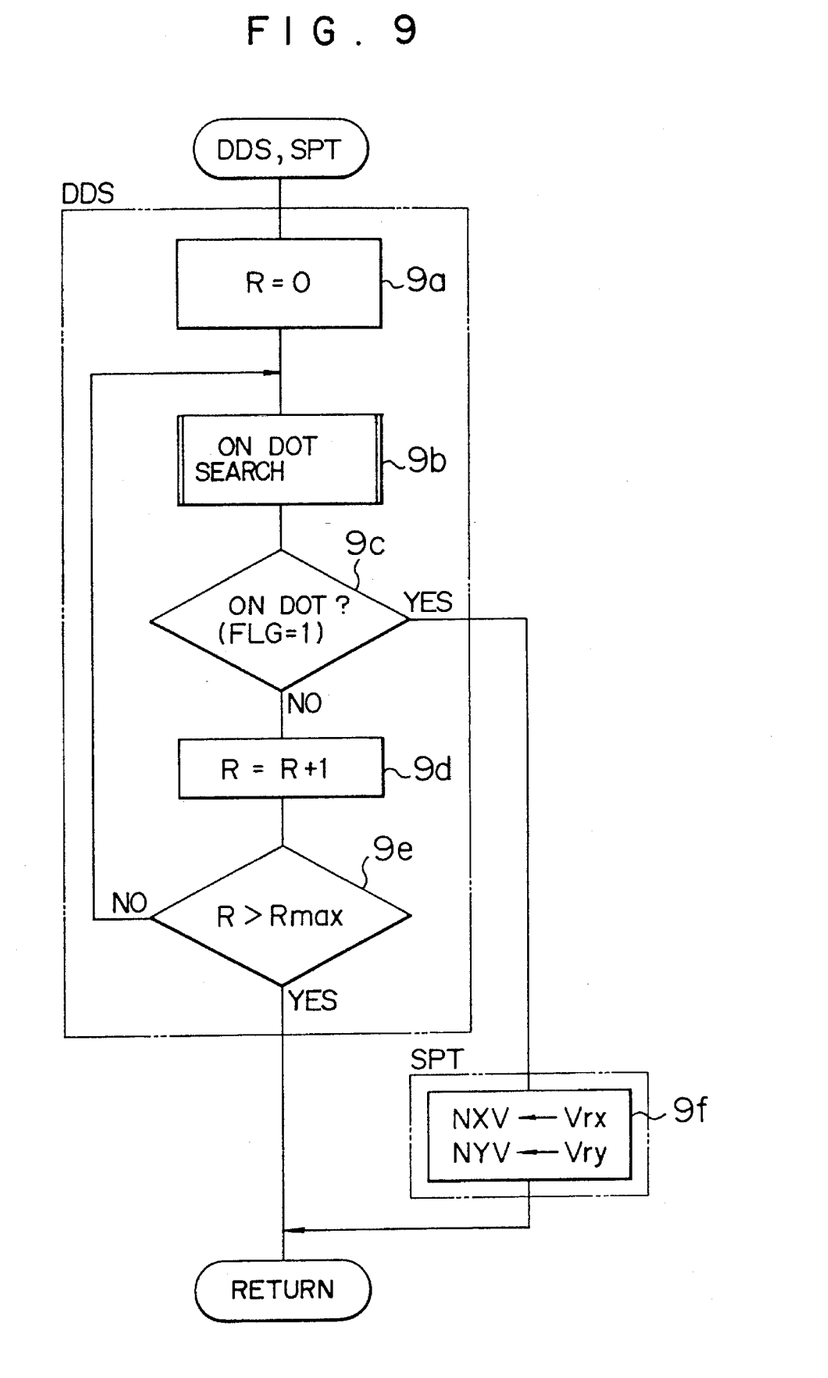
FIG. 9 shows a flow chart of one embodiment of discrimination means and coordinate altering means.

FIG. 9 shows a flow chart of the discrimination procedure DDS shown in the steps 1c and 1d of FIG. 1 and the coordinate altering procedure SPT shown in the step 1e. Prior to the explanation of the procedure DDS and SPT, a principle of determination of a neighbourhood dot in the present embodiment is explained with reference to FIG. 7. In the present embodiment, a circle which is centered at the coordinates of the cursor CS and which has a radius r, which is incremented by one dot unit starting from zero, is considered. Dots which exist on the circumference of the circle are extracted and the status of the dots, that is, ON status, or OFF status is detected. In the present embodiment, the radius r is increased upto the value stored in the memory field $R_{max}$. The dots which exist on the circumference of the circle having the radius r mean those dots which constitute the circle when it is drawn, and they either exist exactly on the circumference of the circle having the radius r or exist approximately thereon.

Figure 10:
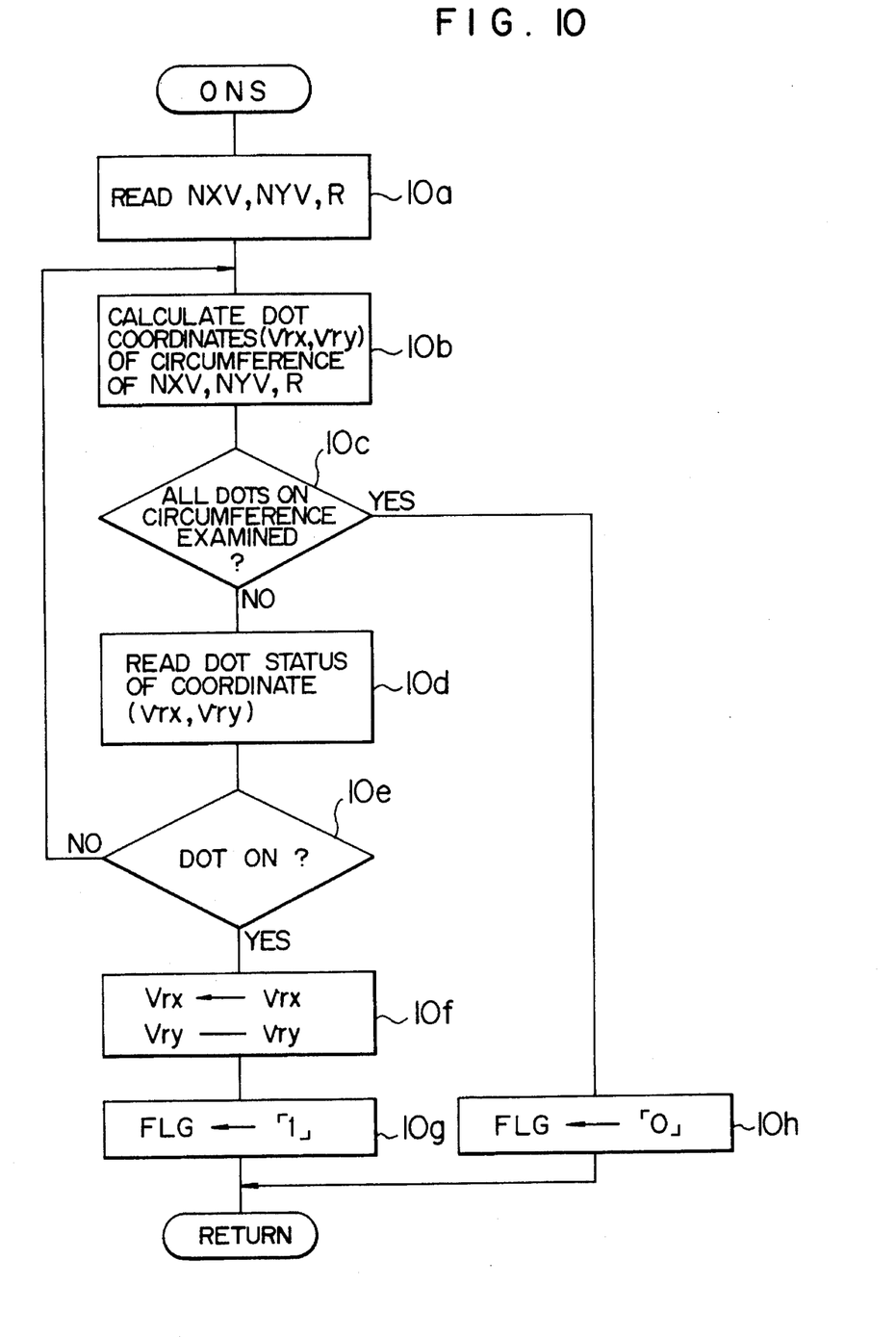
FIG. 10 shows a flow chart of one embodiment of ON dot search means.

Now reference is made to FIG. 9. When the procedure DDS is started, it initializes the content of the radius memory field R to zero in a step 9a. The process then proceeds to the ON dot search step ONS which searches the ON dot. FIG. 10 shows a flow chart of the ON dot search step ONS. When it is started, it reads the contents of the memory fields NXV, NYV and R in step 10a. In step 10b, coordinates (Vrx, Vry) of a dot on the circumference is calculated for a circle which is centered at the dot position designated by the next X-axis and next Y-axis coordinate memory fields NXV and NYV and which has a radius r stored in the memory field R. In step 10c, whether all dots on the circumference have been checked or not is determined. If all dots have not yet been checked, the dot status of the coordinates calculated in the step 10b is read. In step 10e, whether the dot status is ON or OFF is determined. If it is not ON, the process returns to step 10b, and steps 10b, 10c and 10d are repeated for the next dot. If it is ON, the process proceeds to a step 10f where the X coordinate Vrx and the Y coordinate Vry of the dot coordinates (Vrx, Vry) are stored in the dot X-axis coordinate memory field Vrx and the dot Y-axis coordinate memory field Vry, respectively. In step 10g, "1" is stored in the memory field FLG.

If there is no ON dot on the circumference of the radius r in the repeated execution of steps 10b, 10c, 10d and 10e, the process proceeds from step 10c to step 10h where "0" is stored in the memory field FLG; that is, the information indicating the absence of an ON dot is stored. Thus, the processing of the step ONS for one radius r is terminated. Then, the process proceeds to step 9c of FIG. 9.

In step 9c, whether the ON dot has been detected or not is checked based on the result of the execution of step 9b. This is determined by checking whether the content of the memory field FLG is "1" or "0". If it is not "1", it means that the ON dot has not yet been detected, and the content of the radius memory field R is incremented by one dot unit in step 9d. In step 9e, whether the incremented content of the radius memory field R exceeds the predetermined maximum allowable limit stored in the memory field $R_{max}$ is determined. If it does not exceed this, the process is again returned to step 9b where the ON dot search means ONS is activated in accordance with the radius r incremented in step 9d. Step 9b, 9c, 9d and 9e are repeatedly executed until the ON dot is detected in step 9c or the radius r exceeds the maximum allowable limit. If the ON dot is detected in the step 9c, the process proceeds to step 9f where the coordinate altering means SPT is activated. It stores the coordinates of the ON dot Stored in the coordinate memory fields Vrx and Vry in step 10f of the ON dot search step ONS shown in FIG. 10, into the next X-axis and next Y-axis coordinate memories NXV and NYV. If the contents of the radius memory field R exceed the contents of the maximum allowable limit memory field $R_{max}$ in step 9e, the means DDS is deactivated. Step 9e may not be provided in principle. When it is not provided, the radius is expanded without limit and the presence or absence of the ON dot is determined for each increment. In the present embodiment, when the cursor deviates from the curved line N by more than a predetermined distance, the cursor CS is inhibited from following the curved line N so that the operability is enhanced. As is apparent from FIG. 1, the procedure DDS is repeatedly activated at a predetermined time interval. Accordingly, if the mouse M is rapidly manipulated to move off the curved line N, the cursor CS which has been moving along the curved line N deviates from the curved line N by the action of step 9e.

Figure 11:
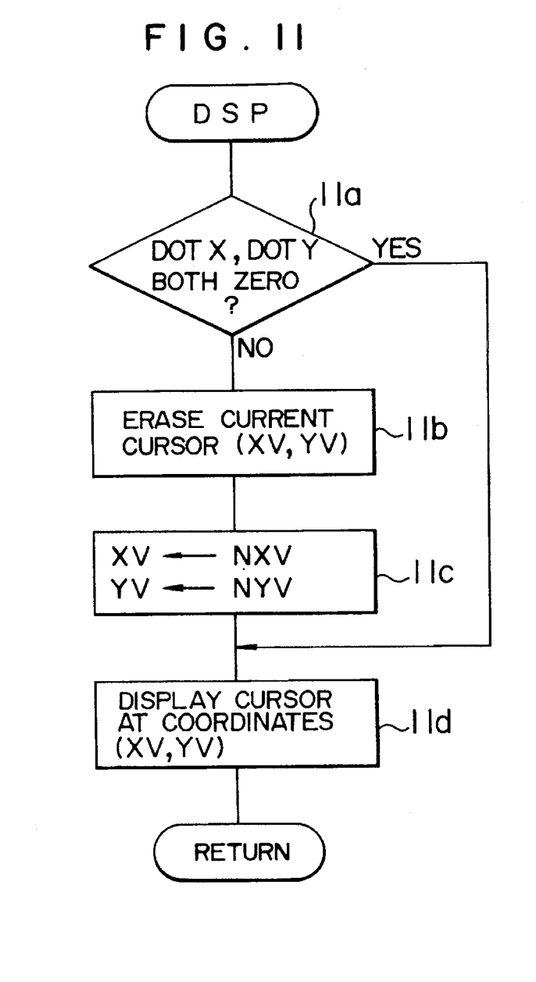
FIG. 11 shows a flow chart of one embodiment of cursor display means.

FIG. 11 shows a flow chart of the cursor display step DSP shown in step 1f of FIG. 1. When the step DSP is started, it determines, in step 11a, whether the contents of the memory fields DOTX and DOTY, which store the number of dots of the movement of the cursor CS on the display screen SC, are both zero, or not. If they are not both zero, it erases, in step 11b, the cursor CS displayed on the display screen SC at the position designated by the contents of the X-axis and Y-axis coordinate memory areas XV and YV. In step 11c, the contents of the next X-axis and Y-axis coordinate memory fields NXV and NYV, which store the coordinates at which the cursor CS is to be next positioned and which have been updated by the cursor coordinate updating step CPT 1a of FIG. 1 or altered by the coordinate altering step SPT 1e of FIG. 1, are stored in the X-axis and Y-axis coordinate memory areas XV and YV, respectively. In step 11d, the cursor CS is displayed at the position on the display screen designated by the X-axis and Y-axis coordinate memory fields XV and YV. In the step 11a, if contents of the memory fields DOTX and DOTY are both zero, that is, if the mouse M has not been moved since the displacement of the mouse M was previously read, the process directly proceeds to the step 11d where the cursor CS is displayed at the same position as that of the previous step.

In accordance with the present embodiment, when a point on the curved line N is to be designated by the cursor CS, the cursor CS is positioned, by moving the mouse M, to the vicinity of the curved line N drawn on the display screen SC. If the specified actuation is done, that is, if the switch SW2 of the mouse is depressed, the existence of the cursor CS in the vicinity of the curved line N is determined by the discrimination step DDS. The coordinate altering step SPT positions the cursor CS onto the curved line N. As seen from FIG. 1, the cursor coordinate updating step CPT, discrimination step DDS, coordinate updating step SPT and cursor display step DSP are repeatedly activated at a short time interval. Thus, if the mouse M is moved while the switch SW2 of the mouse M is kept depressed, the cursor CS is moved along the curved line N in the direction of movement of the mouse M. Accordingly, the designation of a point on the curved line drawn on the display screen SC and the fine movement of the cursor in determining the position of the cursor are very much facilitated and the operability is considerably improved.

In this embodiment, the mouse is used as the actuation means, although any device which can issue a movement command to the cursor displayed on the display screen may be used. For example, a cursor control key arranged on the keyboard connected to the computer unit, a joy stick or a track ball may be used. While the specified actuation is assigned to the switch SW2 of the mouse M in this embodiment, other device may be used. For example, it may be the switch SW1 of the mouse, or simultaneous depression or non-depression of the switches SW1 and SW2. It also may be any key arranged on the keyboard connected to the computer unit or a key of the joy stick or track ball.

While the presence or absence of the specified actuation is detected prior to the activation of the discrimination step DDS in the embodiment as shown in FIG. 1, it is sufficient if the contents of the X-axis and Y-axis coordinate memory fields XV and YV are finally altered by the specified actuation and it is not limited to the position. For example, it may be executed after the discrimination step DDS has been activated and after the coordinate altering step SPT is activated. Again, it is not limited by the position.

In the embodiment, the ON dot in the vicinity is detected by extracting the dots on the circumference of the circle which is centered at the coordinates to which the cursor CS is to be positioned and which has the radius r which is sequentially incremented by one dot unit starting from zero. However, the detection is not limited thereto but a maximum allowable limit of the coordinates to which the cursor CS is to be positioned may be predetermined and the ON status of the dots within this range may be determined.

In essence, it is sufficient to determine the vicinity of the target curved line and the above embodiment is not limitive.

I claim:

1. In a system for controlling movement of a cursor on a display screen in accordance with movement command information from manually operated cursor movement actuation means, a method for controlling movement of the cursor comprising the steps of:

sequentially receiving movement command information from said cursor movement actuation means;

calculating coordinates of a destination of the cursor on the display screen based on the received movement command information;

detecting coordinates on a curved line drawn on the display screen which detected coordinates are in the vicinity of the calculated coordinates;

altering the coordinates of the destination of the cursor to the detected coordinates and displaying the cursor at the altered coordinates to sequentially move the cursor along the curved line in accordance with the received information.

2. A method for controlling movement of a cursor according to claim 1 wherein said detecting step determines whether the detected coordinates on the curved line are within a predetermined area or not.

3. A method for controlling movement of a cursor according to claim 1 wherein said detecting step determines whether the detected coordinates on the curved line are within a circle, centered at the calculated coordinates and having a predetermined radius, or not.

4. A method for controlling movement of a cursor according to claim 1 wherein said detection step determines whether the detected coordinates on the curved line are on a circumference of a circle which is centered at the calculated coordinates and which has a radius which is sequentially incremented by a unit coordinate.

5. A method for controlling movement of a cursor according to claim 1 wherein said cursor movement actuation means produces the movement command information of the cursor in accordance with physical movement actuation of said cursor movement actuation means.

6. A method for controlling movement of a cursor according to claim 5 wherein said cursor movement actuation means is a mouse.

7. An apparatus for controlling movement of a cursor comprising:

a cursor coordinate memory for storing coordinate information of the cursor position on a display screen;

display means for displaying the cursor at a cursor position on the display screen in accordance with the coordinate information stored in said cursor coordinate memory;

cursor movement actuation means for producing command information for movement of the cursor on the display screen;

calculation means for calculating coordinates of a destination of the cursor on the display screen based on the produced command information;

search means for locating coordinates on the curved line which are in the vicinity of the coordinates calculated by said calculation means; and coordinate altering means for altering the contents of said cursor coordinate memory to the located coordinates to move the cursor along a curved line drawn on said display screen.

8. An apparatus for controlling movement of a cursor according to claim 7 wherein said search means locates any point on the curved line which is within a predetermined range from the coordinates calculated by said calculation means.

9. An apparatus for controlling movement of a cursor according to claim 7 wherein said search means locates any point on the curved line which is within the circle centered at the coordinates calculated by said calculation means and having a predetermined radius.

10. An apparatus for controlling movement of a cursor according to claim 7 wherein said search means locates any point on the curved line which is on the circumference of a circle centered at the coordinates calculated by said calculation means and having a radius which is sequentially incremented by a coordinate unit.

11. An apparatus for controlling movement of a cursor according to claim 7 wherein said cursor movement actuation means produces the command information in accordance with physical movement of said cursor movement actuation means.

12. An apparatus for controlling movement of a cursor according to claim 11 wherein said cursor movement actuation means is a mouse.

13. An apparatus for controlling movement of a cursor according to claim 7 further comprising a display screen having a dot matrix structure, and wherein the coordinate information represents dot coordinates on the display screen.

14. An apparatus for controlling movement of a cursor comprising:

a cursor coordinate memory for storing coordinate information of the cursor position on a display screen;

display means for displaying the cursor at a cursor position on the display screen in accordance with the coordinate information stored in said cursor coordinate memory;

cursor movement actuation means for producing command information for movement of the cursor on the display screen;

specified actuation detection means for detecting actuation by an operator of a specified actuator on said cursor movement actuation means and for producing detection information indicative thereof;

calculation means responsive to the command information and the detection information for sequentially calculating a position on the display screen at which the cursor is to be displayed; and cursor position altering means for sequentially altering the contents of said cursor coordinate memory to cause the cursor to move onto a curved line displayed in the vicinity of the display position as calculated by said calculation means.

15. An apparatus for controlling movement of a cursor comprising:

a cursor coordinate memory for storing coordinate information of the cursor position on a display screen;

display means for displaying the cursor at a cursor position on the display screen in accordance with the coordinate information stored in said cursor coordinate memory;

cursor movement actuation means for producing command information for movement of the cursor on the display screen;

specified actuation detection means for detecting actuation by an operator of a specified actuator on said cursor movement actuation means and for producing detection information indicative thereof;

cursor movement control means responsive to the command information for sequentially updating the contents of said cursor coordinate memory to move the cursor in accordance with the command information; and cursor position altering means responsive to the detection information for sequentially altering the contents of said cursor coordinate memory to sequentially move the cursor onto a curved line displayed in the vicinity of the position to which the cursor is moved by said cursor movement control means.

16. An apparatus for controlling movement of a cursor comprising:

a cursor coordinate memory for storing coordinate information of the cursor position on a display screen;

display means for displaying the cursor at a cursor position on the display screen in accordance with the coordinate information stored in said cursor coordinate memory;

cursor movement actuation means for producing command information for movement of the cursor on the display screen;

discrimination means for detecting a specified actuation by an operator;

cursor position altering means responsive to the detecting of the specified actuation by said discrimination means for altering the contents of the cursor coordinate memory to cause the cursor to sequentially move along a curved line drawn on the display screen; and cursor movement control means responsive to the absence of detecting of the specified actuation by said discrimination means for sequentially updating the contents of said cursor coordinate memory to control the movement of the cursor in accordance with the command information.

17. An apparatus for controlling movement of a cursor according to claim 16 wherein said cursor position altering means includes means for sequentially altering the contents of said cursor coordinate memory to cause the cursor to sequentially move onto a curved line displayed in the vicinity of a positon at which the cursor is to be moved in accordance with the command information.

18. An apparatus for controlling movement of a cursor according to claim 17 wherein said cursor position altering means includes means for altering the contents of said cursor coordinate memory to cause the cursor to move to a display position when the curved line is not in the vicinity of the position indicated by the command information.

19. In a system having coordinate updating means for sequentially updating the contents of a cursor coordinate memory which stores coordinate information of a cursor position on a display screen in accordance with movement command information from cursor movement actuation means for sequentially causing the cursor to move to a position on the display screen in accordance with the coordinate information, an apparatus for controlling movement of the cursor comprising:

discriminating means for determining whether the cursor position indicated by the coordinate information is in the vicinity of a curved line on the display screen or not; and coordinate altering means responsive to a specified actuation for altering the contents of said cursor coordinate memory to the coordinates of a point on the curved line when said discrimination means determines that the coordinate information is in the vicinity of the curved line.

20. An apparatus for controlling movement of a cursor according to claim 19 wherein said cursor movement actuation means includes means for producing the movement command information in accordance with physical movement of said cursor movement actuation means.

21. An apparatus for controlling movement of a cursor according to claim 20 wherein said cursor movement actuation means is a mouse.

22. An apparatus for controlling movement of a cursor according to claim 19 wherein said discrimination means includes means for determining whether any point on the curved line exists in the vicinity of the cursor position from the contents of the cursor coordinate memory as updated by said coordinate altering means.

23. An apparatus for controlling movement of a cursor according to claim 22 wherein said discrimination means includes means for determining whether any point on the curved line exists within a circle centered at coordinates indicated by the contents of the cursor coordinate memory as updated by said coordinate updating means and having a predetermined radius.

24. An apparatus for controlling movement of a cursor according to claim 22 wherein said discrimination means includes means for determining whether any point on the curved line exists on the circumference of a circle centered at coordinates indicated by the contents of the cursor coordinate memory as updated by said coordinate updating means and having a radius, and means for sequentially incrementing the radius by increments equal to a display unit of the display screen.

25. An apparatus for controlling movement of a cursor according to claim 21 wherein the specified actuation is the depression of a switch arranged on the mouse.

26. A method for controlling movement of a cursor on a display screen in accordance with movement command information from manually operated cursor movement actuation means, said method comprising the steps of:

sequentially receiving movement command information from said cursor movement actuation means;

calculating coordinates of a destination of the cursor on the display screen based on the received movement command information;

detecting coordinates on a curved line drawn on the display screen which detected coordinates are in the vicinity of the calculated coordinates;

altering the coordinates of the destination of the cursor to the detected coordinates; and displaying the cursor at the altered coordinates, whereby the cursor sequentially moves along the curved line.

27. A method for controlling movement of a cursor according to claim 26 wherein the detecting of coordinates includes determining whether the detected coordinates on the curved line are within a predetermined area or not.

28. A method for controlling movement of a cursor according to claim 26 wherein the detecting of coordinates includes determining whether the detected coordinates on the curved line are within a circle centered at the calculated coordinates and having a predetermined radius.

29. A method for controlling movement of a cursor according to claim 26 wherein the detecting of coordinates includes determining when the detected coordinates on the curved line are on a circumference of a circle which is centered at the calculated coordinates and which has a radius that is sequentially increased in one coordinate unit increments.

30. A method for controlling movement of a cursor according to claim 26 wherein the receiving of movement command information includes detecting physical movement of said cursor movement actuation means.

31. A method for controlling movement of a cursor according to claim 30 wherein the detecting of physical movement includes detecting physical movement of a mouse.

32. A method for controlling movement of a cursor on a display screen to move the cursor along a curved line on the display screen, said method comprising the steps of:

(a) sequentially receiving movement command information from cursor movement actuation means;

(b) calculating coordinates of a destination of the cursor on the display screen based on the received movement command information;

(c) detecting coordinates on the curved line on the display screen which detected coordinates are in the vicinity of the calculated coordinates;

(d) determining whether the detected coordinates are within a circle centered at the calculated coordinates and having a predetermined radius;

(e) when step (d) determines that the detected coordinates are not within the circle, increasing the predetermined radius by one coordinate unit and repeating step (d);

(f) when step (d) determines that the detected coordinates are within the circle, altering the coordinates of the destination of the cursor to the detected coordinates; and (g) displaying the cursor at the altered coordinates;

whereby the cursor moves along the curved line.

33. A method for controlling movement of a cursor on a display screen to move the cursor along a curved line on the display screen, said method comprising the steps of:

(a) sequentially receiving movement command information from cursor movement actuation means;

(b) calculating coordinates of a destination of the cursor on the display screen based on the received movement command information;

(c) detecting coordinates on the curved line on the display screen which detected coordinates are in the vicinity of the calculated coordinates;

(d) determining whether the detected coordinates are on the circumference of a circle which is centered at the calculated coordinates and which has a predetermined radius;

(e) when step (d) determines that the detected coordinates are not on the circumference of the circle, increasing the predetermined radius by one coordinate unit and repeating step (d);

(f) when step (d) determines that the detected coordinates are on the circumference of the circle, altering the coordinates of the destination of the cursor to the detected coordinates; and (g) displaying the cursor at the altered coordinates;

whereby the cursor moves along the curved line.

34. An apparatus for controlling movement of a cursor on a display screen to move the cursor along a curved line on the display screen, said apparatus comprising:

a cursor coordinate memory for storing coordinate information of the cursor position on the display screen;

display means for displaying the cursor at a cursor position on the display screen in accordance with the coordinate information stored in said cursor coordinate memory;

cursor movement actuation means for producing command information for movement of the cursor on the display screen;

calculation means for calculating coordinates of a destination of the cursor on the display screen based on the produced command information;

search means for searching for coordinates on the curved line and within a circle which is centered at the calculated coordinates and which has a predetermined radius;

incrementing means responsive to said search means failing to locate coordinates on the curved line and within the circle for increasing the predetermined radius by one coordinate unit; and coordinate altering means responsive to said search means locating coordinates on the curved line and within the circle for altering the contents of said cursor coordinate memory to the located coordinates to move the cursor along the curved line.

35. An apparatus for controlling movement of a cursor on a display screen to move the cursor along a curved line on the display screen, said apparatus comprising:

a cursor coordinate memory for storing coordinate information of the cursor position on the display screen;

display means for displaying the cursor at a cursor position on the display screen in accordance with the coordinate information stored in said cursor coordinate memory;

cursor movement actuation means for producing command information for movement of the cursor on the display screen;

calculation means for calculating coordinates of a destination of the cursor on the display screen based on the produced command information;

search means for searching for coordinates on the curved line and on the circumference of a circle which is centered at the calculated coordinates and which has a predetermined radius;

incrementing means responsive to said search means failing to locate coordinates on the curved line and on the circumference of the circle for increasing the predetermined radius by one coordinate unit; and coordinate altering means responsive to said search means locating coordinates on the curved line and on the circumference of the circle for altering the contents of said cursor coordinate memory to the located coordinates to move the cursor along the curved line.

\* \* \* \* \*